(12) United States Patent
Glonner et al.

(10) Patent No.: US 6,705,416 B1
(45) Date of Patent: Mar. 16, 2004

(54) HYBRID PROPULSION SYSTEM COMPRISING SHIFTABLE CLUTCHES PROVIDED FOR A MOTOR VEHICLE

(75) Inventors: Hans Glonner, Pfaffenhofen (DE); Bernhard Sich, Friedrichshafen (DE); Gerhard Gumpoltsberger, Friedrichshafen (DE); Hans-Jörg Domian, Immenstaad (DE); Ralf Dreibholz, Meckenbeuren (DE); Markus Kaindl, Rohrbach (DE); Jörg Michael, Ingolstadt (DE)

(73) Assignee: ZF Friedrichshafen KG, Friedrichshafen (DE)

( * ) Notice: Subject to any disclaimer, the term of this patent is extended or adjusted under 35 U.S.C. 154(b) by 0 days.

(21) Appl. No.: 09/959,092
(22) PCT Filed: Apr. 13, 2000
(86) PCT No.: PCT/EP00/03321
§ 371 (c)(1),
(2), (4) Date: Oct. 17, 2001
(87) PCT Pub. No.: WO00/63041
PCT Pub. Date: Oct. 26, 2000

(30) Foreign Application Priority Data

Apr. 19, 1999 (DE) .......................... 199 17 665

(51) Int. Cl.[7] .............. B60K 6/00; B60K 1/00; F16H 3/72
(52) U.S. Cl. ............... 180/65.2; 180/65.3; 180/65.4; 180/65.6; 475/5
(58) Field of Search ............ 180/65.2, 65.3, 180/65.4, 65.6, 65.7, 65.8; 475/5

(56) References Cited

U.S. PATENT DOCUMENTS

| 4,335,429 A | | 6/1982 | Kawakatsu | |
|---|---|---|---|---|
| 4,354,144 A | * | 10/1982 | McCarthy | 318/13 |
| 5,492,189 A | | 2/1996 | Kriegler et al. | |
| 5,635,805 A | | 6/1997 | Ibaraki et al. | |
| 5,923,093 A | * | 7/1999 | Tabata et al. | 290/40 C |
| 5,993,351 A | * | 11/1999 | Deguchi et al. | 477/5 |
| 6,024,667 A | * | 2/2000 | Krohm et al. | 477/6 |
| 6,203,468 B1 | * | 3/2001 | Nitta et al. | 477/5 |
| 6,209,672 B1 | * | 4/2001 | Severinsky | 180/65.2 |
| 6,253,127 B1 | * | 6/2001 | Itoyama et al. | 701/22 |

FOREIGN PATENT DOCUMENTS

| DE | 25 01 386 | | 7/1976 | |
| DE | 28 02 635 | | 7/1979 | |
| DE | 30 09 503 | | 9/1981 | |
| DE | 31 50 611 | | 6/1983 | |
| DE | 196 31 123 | | 2/1997 | |
| EP | 0 698 522 | | 2/1996 | |
| EP | 0 510 582 | | 10/2001 | |
| EP | 1216871 A2 | * | 6/2002 | 180/65.2 |
| GB | 2 013 149 | | 8/1979 | |

OTHER PUBLICATIONS

"Stop–Go Systems Get the Green Light", *European Automotive Design*, Apr. 1998, pp 24–26.
Lehna, Dipl.Ing. M., "Audio duo, ein Hybridfahrzeug für die City–Logistik", VDI Berichte 1378, 1998 pp119–129.

\* cited by examiner

*Primary Examiner*—Brian L. Johnson
*Assistant Examiner*—G B Klebe
(74) *Attorney, Agent, or Firm*—Davis & Bujold, PLLC

(57) ABSTRACT

A hybrid drive for a motor vehicle which possesses, in a gear train (1), a first electrical machine (4) located between an internal combustion motor (2) and a multi-gear vehicle transmission (3). The hybrid drive further possesses a second electrical machine (6) permanently connected with an input shaft (5) of the transmission. First and second clutches (7, 8), respectively, are placed between the first and second electrical machines (4, 6) and the internal combustion motor (2) and the first and second electrical machines (4, 6) can be respectively driven as either a motor or a generator.

20 Claims, 1 Drawing Sheet

HYBRID PROPULSION SYSTEM COMPRISING SHIFTABLE CLUTCHES PROVIDED FOR A MOTOR VEHICLE

FIELD OF THE INVENTION

The invention concerns a hybrid drive for a motor vehicle in accordance with a generic concept thereof.

BACKGROUND OF THE INVENTION

A drive system for a motor vehicle normally possesses at least one electrical machine which itself, for instance, can comprise the drive parts.

Electric motors, as drive motors, which are furnished with electrical energy from a battery or an on-board fuel combustion cell, make emission free and nearly noiseless travel possible. An added advantage of such motors is that they are compact in size. As a disadvantage, the travel capacity of a purely electrically driven vehicle is considerably limited because of the low storage capacity of available batteries. On this account, up to now, electric vehicles only find application in special areas.

Besides purely electrical drive systems, partially-electric vehicle drives are also known which, in the practice, are designated as "Hybrid Drive" vehicles. These partial electric drive systems mainly possess an internal combustion motor, as a drive aggregate, which makes a large power capacity possible and extends the travel radius of the motor vehicle. To further implement this advantage, at least one electric machine is placed between the internal combustion motor and the transmission. The said electric machine is placed in series or in parallel with the input gear train and simultaneously offers the advantages of an electric drive, such as induction braking and an emission free travel.

In the case of serial-hybrids, in a travel area with limited demand, the operation can be purely electric, that is, the internal combustion motor and one electric motor are idle, wherein the entire amount of needed energy is furnished by a battery. In a second travel area, where the travel is made via the internal combustion motor which also drives the electrical machine, now operating as a generator, which rotation delivers the energy for the driving motor during electric operation. Such serial hybrid drives operate without constant clutch engagement.

In the case of parallel hybrids, where an electric motor is connected to the input shaft of the transmission, starting motion from rest can be carried out alone with an electric drive. During this electric run, the internal combustion motor idles and is separated from the transmission input shaft by a constant clutch engagement. Upon a call for greater capacity, for instance, to reach a definite high driving speed, the said internal combustion motor is started by the closing of the clutch whereby said internal combustion motor then serves as the primary source of input power. The electric motor can then be used as an auxiliary power source, a booster or as a generator for charging the vehicle battery.

A parallel-hybrid of this kind, with an internal combustion motor, an automatic transmission, a battery, an alternating converter, and a permanently activated synchronizer is, for example, described in the German publication "VDI-Berichte" (Assocation of German Engineers Report), No.: 1378, (1988), M. Lehna: "Audio-duo, a hybrid vehicle for City Logistics", pages 119 to 128.

In this case, the disadvantage of these known parallel-hybrids is, however, that up to the closure of the coupling, a noticeable traction power interruption occurs in the take-off shaft.

With a conventional starter, the internal combustion motor is brought up to its starting rotational speed, in that the starter torque is transferred by a pinion gear to a flywheel of the motor. These known starters are flanged onto the motor block in such a fashion that upon activation, the pinion gear meshes with a ring gear on the flywheel in order to set the motor into rotation.

In the case of such starters, a further disadvantage arises in that their power is not sufficient and their operational life is very limited.

The limited length of operational life makes these starters inappropriate for on-off commands to the internal combustion motor, i.e. the "Start-Stop-Operation" wherein parallel-hybrids with an electric motor adapt themselves fundamentally for such a mode of operation as would noticeably reduce the use of fuel and in which the internal combustion motor would shut off instead of idling and only start when it was really needed.

From the April 1988 issue of the "European Automotive Design" publication, page 24, an alternative starter unit is made known in which an electric motor, installed between the internal combustion motor and the transmission, is directly connected to the drive shaft of the said internal combustion motor and, in addition to its starter function, can assume the function of a generator.

In the case of this development, nevertheless, it could not be avoided that a traction break occurred at the coupling of the crankshaft of the internal combustion motor and the input shaft of the transmission.

A further method, known in the practice, of accelerating the internal combustion motor to its starting rotational speed, that is, to its idling speed, arranges to couple a preliminary start of the internal combustion motor with the transmission input shaft, while acceleration from rest is carried out by the electric motor. The clutch, in this case, does not engage until the difference of the rotational speed is zero.

Where only a single electric motor stands available for this purpose then, when motionless, the vehicle must first start the internal combustion motor, while the transmission is in neutral and the clutch is closed. During this time, the vehicle cannot be driven. Only when the internal combustion motor is up to speed can the clutch, between the internal combustion motor and the transmission, be placed in first gear, whereupon, the normal process of getting underway begins.

Disadvantageously, the start of the vehicle is marked by a clear time delay by this procedure.

A further disadvantage of the known hybrid-drive is found therein in that the hydraulic pump for the transmission which, for example, is integrated into the said transmission, is difficult to bring up to the necessary rotational speed to produce the needed pressure for the shifting elements when the vehicle is starting from rest. The reason for this is that the pump is usually driven by the internal combustion motor, which is not running at that moment due to the starting operation of the electric motor from rest.

In practice, this problem is solved by an external placement of the hydraulic pump and a drive therefor from a dedicated energy source, which shows itself as very expensive and complex.

SUMMARY OF THE INVENTION

The present invention has the purpose of creating a hybrid drive for a motor vehicle in which the current supply of the said vehicle and its aggregate is efficient and by which, in a constructively simple manner, a purely electrical operation with a small need for capacity can be realized and a power input of an internal combustion motor can be achieved at an increased demand for load, during which a change of gear is avoided as far as possible.

In accord with the invention, this purpose is achieved by a hybrid drive according to the invention described in further detail below.

In the case of the hybrid drive in accord with the invention, a very economical and environmentally friendly, purely electrically operated start from rest or from low vehicle speeds is possible in an advantageous manner, such starts that exist, for example, in a stop-go operation or during in-and-out parking procedures. During closure of the second clutch, between the internal combustion motor and the electrical machine, the already running internal combustion motor is engaged so that full vehicle power is available.

By means of the invented placement of the electric machines and the clutches, the gear-change function can be carried out without a significant traction detriment coupling of the internal combustion motor and the input transmission shaft occurs at a small difference in rotational speeds which, in the optimal case, is practically zero.

By means of the invented interposing of a second electric machine between the internal combustion motor and the input shaft of the transmission of the input drive train, a first electric machine can advantageously take on a plurality of functions. That first electric motor can serve as a starter for the internal combustion motor or as a generator for the electrical system, the latter including charging the battery or for the delivery of electrical power to other user operations, such as a drive for the hydraulic pump of the vehicle transmission and probably as a drive for further subordinate aggregates such as an air conditioner compressor, a power steering pump, a braking amplifier, or the water pump.

Hence, the invention offers the advantage that a multiplicity of electrical components, such as drives for the starter, the generator, or the pump become superfluous which, in the case of conventional hybrid drives, are substantial cost factors.

Further, with the invented achievements of the purposes of the invention, an improved start-stop operation is possible since the internal combustion motor, during a purely electrical starting up routine, can be started by the first electrical machine in a short time without a reactive effect on the crankshaft.

An additional advantage is a reaction improvement when starting from rest with a high traction requirement. If, when in the case of a start from rest with purely electrical means is underway and a high traction need suddenly occurs, for instance, on a mountain or during the need for a forced downshift, then the internal combustion motor must be automatically started. With the invented arrangement in which a second electrical machine can be in use for acceleration from rest or low speed and, at the same time, the internal combustion motor can be started by a first electrical machine and engaged by means of a slip clutch, a substantial improvement in the reaction time can be achieved.

This operation advantageously provides a large availability of traction which comprises the sum of the torque of the internal combustion motor, the torque of the first electrical machine, and the torque of the second electrical machine.

The invention is particularly adapted for an automatic drive, although it fits well in any type of transmission.

BRIEF DESCRIPTION OF THE DRAWINGS

The invention will now be described, by way of example, with reference to the accompanying drawings in which.

DETAILED DESCRIPTION OF THE INVENTION

Figure 1:
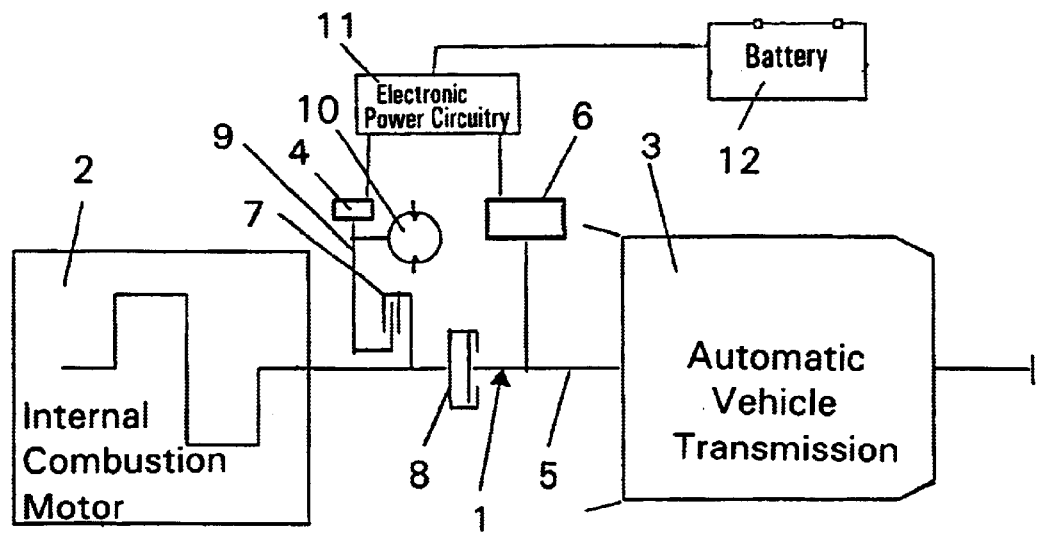
FIG. 1 a schematic presentation of a hybrid drive for a motor vehicle with the electrical machines arranged as a parallel hybrid.
Figure 2:
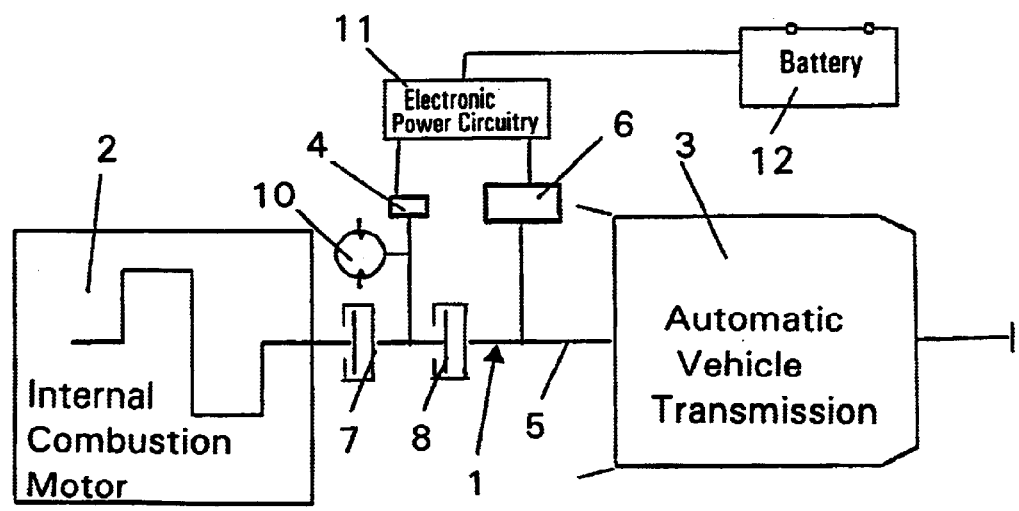
FIG. 2 a schematic presentation of a hybrid drive for a motor vehicle with the electrical machines arranged as a series hybrid.

Referring to the FIGS. 1, 2, a hybrid drive for a motor vehicle with a gear drive train 1 is presented in a very schematic way. These figures show a first electric machine 4 and a second electric machine 6 between an internal combustion motor 2 and a multi-gear, automatic transmission 3. The second machine 6 is directly and permanently connected to a transmission input shaft 5. Between the electrical machines 4 and 6 and the internal combustion motor 2 which, at times can be run as either a motor or a generator, are respectively inserted clutches 7 and 8.

In the mode of construction in accord with FIG. 1, the first clutch 7 and the first electric machine 4 are placed in a parallel side train 9 which branches off from the input drive train 1, between the internal combustion motor 2 and the second clutch 8. This arrangement forms a parallel hybrid. The first electric machine 4 is thus separated from the internal combustion motor 2 by the first clutch 7. The second electric machine 6 is separated from the internal combustion motor 2 by the second clutch 8.

Contrary to this, in the case of the series hybrid, as is shown in FIG. 2, the first clutch 7 and the first electric machine 4 and, thereafter, the second clutch 8 and the second electric machine 6 are aligned in series in the input drive train 1, in a direction away from the vehicle transmission 3.

In both arrangements, the first electric machine is provided to start the internal combustion motor 2 whereby the first clutch 7 is closed, or slips.

In principle, the starter function can be taken over by both electrical machines 4 and 6.

If the internal combustion motor 2 is very cold, for instance, it can occur that the first electric machine 4, which is designed to be smaller than the second electric machine 6, cannot develop sufficient torque for starting of the internal combustion motor 2. In this case, the somewhat more powerful second electrical machine 6 operates under a specified temperature. In this way, sufficient torque can always be generated to start the internal combustion motor 2.

Starting from rest is also possible with the second electrical machine 6 plus the running internal combustion motor 2, since internal combustion motor 2 connected by the first clutch 7 with the first electric machine 4, during startup-from-rest in the case of a need traction, at a defined threshold value of traction can be coupled with the transmission input shaft 5 and the second electrical machine 6. In this case, the second clutch 8 is shifted to a slipping condition.

With a coupling of this kind, a composite torque summation is achieved whereby a very large torque is made available which produces a greater startup from rest than, for instance, a converter with additional torque properties.

In the case of normal operation, the second clutch 8 couples the internal combustion motor 2 with the transmission input shaft 5, in the depicted modes of construction, if the difference of their rotational speeds is zero, whereat no traction power interruption occurs upon the starting of the internal combustion motor 2.

Obviously, clutch engagement is also possible at small differences in rotational speeds.

In order to carry out such engagements, the clutches 7, 8 in the present embodiment example, are designed as positive engagement clutches, in which case the difference of the rotational speeds is diminished by friction.

In each shown design, the first electrical machine 4 is directly connected with a hydraulic pump 10 of the automatic transmission 3. The hydraulic pump 10 is located between the first clutch 7 and the first electrical machine 4. The hydraulic pump is driven by the first electrical machine 4 or mechanically operated by the internal combustion motor 2 by means engagement of the first clutch 7.

If the hydraulic pump 10 is purely mechanically driven whereby the first clutch 7 is closed, and a power chain is complete between the internal combustion motor 2 and the hydraulic pump 10, then no electric conversion losses occur and also, almost no mechanical losses, on which account a substantially better efficiency is obtained than is the case with electric drive.

Further, the shown arrangement of the hydraulic pump 10 presents the advantage that it can be driven within a narrow range of rotational speeds, which speeds correspond to the main running range of the internal combustion motor 2. The hydraulic pump 10 can be electrically installed without a control valve so that it pumps only the necessary quantity of oil at a higher rate of rotational speed, and thus can be constructed of smaller dimensions.

Because of the fact that the hydraulic pump 10 can be driven both electrically as well as mechanically, a pump design with a lower rotational speed range is possible whereby more efficient operation with less pump losses can be achieved.

As can be inferred from FIGS. 1, 2, the electrical machines 4, 6 are linked together by a power electronic circuit 11 and with a source of electrical energy 12, which normally is a battery.

The first electrical machine 4 can be driven by current from the battery 12 or through the electronic power circuitry 11 with current from the second electrical machine 6, with the latter acting as a generator while the second clutch 8 is shifted into an open or slip condition.

Alternative to this, also the first electrical machine 4 can be driven as a generator, whereby the second clutch 8 is placed in a closed or slip position.

Reference Number List

1 Gear train to input shaft of transmission
2 Internal combustion motor
3 Automatic vehicle transmission
4 First electrical machine
5 Input shaft of transmission
6 Second electrical machine
7 First clutch
8 Second clutch
10 Hydraulic pump of the vehicle transmission
11 Electronic power circuitry
12 Electrical energy source, i.e. battery

What is claimed is:

1. A hybrid drive for a motor vehicle with a drive train (1) comprising:

an internal combustion motor (2) for driving a vehicle transmission (3) with changeable gear ratios, the hybrid drive having a first electric machine (4) located in a drive flow path between the internal combustion motor (2) and the vehicle transmission (3) and the hybrid drive further having a second electrical machine (6) also located in the drive flow path between the internal combustion motor (2) and the vehicle transmission (3), a first clutch (7) located between the first electrical machine (4) and the internal combustion motor (2);

a second clutch (8) being located between the second electrical machines (6) and the internal combustion motor (2), and the first and second electric machines (4) can be driven as a motor and as a generator; and wherein the second electrical machine (6) is permanently connected with a transmission input shaft (5) to rotate therewith.

2. The hybrid drive in according to claim 1, wherein the first clutch (7), the first electrical machine (4), the second clutch (8) and the second electrical machine (6) are each sequentially arranged in series along the input drive train (1) in a direction leading away from the internal combustion motor (2).

3. The hybrid drive according to claim 1, wherein the first clutch (7) and the first electrical machine (4) are arranged in a parallel side train (9), between the internal combustion motor (2) and the second clutch (8), branching from the transmission input drive train (1), the first electrical machine (4) is separatable from the internal combustion motor (2) by the first clutch (7), and the second electrical machine (6) is separatable from the internal combustion motor (2) by the second clutch (8).

4. The hybrid drive according to claim 1, wherein the first electrical machine (4) is connected with a hydraulic pump (10) of the vehicle transmission (3).

5. The hybrid drive according to claim 4, wherein the hydraulic pump (10) is located between the first clutch (7) and the first electrical machine (4), whereby the hydraulic pump (10) can be one of mechanically driven by the internal combustion motor (2) and electrically driven by the first electrical machine (4).

6. The hybrid drive according to claim 1, wherein the first electrical machine (4) is provided for starting the internal combustion motor (2) when the first clutch (7) is one of in an engaged and in a partial slip condition.

7. The hybrid drive according to claim 1, wherein the second electrical machine (6) is provided for electrically starting the hybrid drive from a rest position.

8. The hybrid drive according to claim 1, wherein the second clutch (8) couples the internal combustion motor (2) to the input shaft (5) of the transmission (3) only once a rotational speed difference, between a rotational speed of the internal combustion motor (2) and a rotational speed of the input shaft (5), is less than a specified threshold value.

9. The hybrid drive according to claim 1, wherein the second clutch (8) couples the internal combustion motor (2) to the input shaft (5) of the transmission (3) only once a rotational speed difference, between a rotational speed of the internal combustion motor (2) and a rotational speed of the input shaft (5), is approaching zero.

10. The hybrid drive according to claim 1, wherein, in case of a traction requirement in excess of a specified threshold, the internal combustion motor (2), which is connected with the first electrical machine (4) via the first clutch (7), is coupleable with the transmission input shaft (5) and with the second electrical machine (6) when the second clutch (8) shifts to an engaged condition.

11. The hybrid drive according to claim 1, wherein second electrical machine (6) is engages as a starter when a temperature of the internal combustion motor (2) is below a predefined threshold temperature.

12. The hybrid drive according to claim 1, wherein, by means of an electronic power circuit (11), the first and second electrical machines (4 and 6) are one of connected together with one another and are connected with a source of electrical energy.

13. The hybrid drive according to claim 12, wherein the first electrical machine (4) can be one of driven with current supplied by the source of electrical energy (12) and driven via the electronic power circuit (11) with current from the second electrical machine (6), and the second electrical machine (6) operates as a generator when the second clutch (8) is shifted to one of an open state and a slipping condition.

14. The hybrid drive according to claim 13, wherein the source of electrical energy is a battery (12).

15. The hybrid drive according to claim 12, wherein the first electrical machine (4) is driven as a generator when the second clutch (8) is in one of a closed condition and a slipping condition.

16. The hybrid drive according to claim 1, wherein at least one of the first clutch (7) and the second clutch (8) is a positive engagement clutch.

17. The hybrid drive according to claim 1, wherein at least one associated power take-off is connected to a drive of the first electrical machine (4).

18. The hybrid drive according to claim 1, wherein the second electrical machine (6) has a power capacity which is greater than a power capacity of the first electrical machine (4).

19. The hybrid drive according to claim 1, wherein the vehicle transmission is an automatic transmission (3).

20. A hybrid drive for a motor vehicle with a drive train (1) comprising an internal combustion motor (2) for driving a vehicle transmission (3) with changeable gear ratios, the hybrid drive having a first electric machine (4) located in a drive flow path between the internal combustion motor (2) and the vehicle transmission (3) and the hybrid drive further having a second electrical machine (6) also located in the drive flow path between the internal combustion motor (2) and the vehicle transmission (3), and first and second clutches (7, 8) being respectively located between the first and second electrical machines (4, 6) and the internal combustion motor (2), and the first and second electric machines (16) can be driven as a motor and as a generator;

wherein the second electrical machine (6) is permanently connected with a transmission input shaft (5) to rotate therewith; and wherein the first electrical machine (4) is connected with a hydraulic pump (10) of the vehicle transmission (3), the hydraulic pump (10) is located between the first clutch (7) and the first electrical machine (4), whereby the hydraulic pump (10) can be one of mechanically driven by the internal combustion motor (2) and electrically driven by the first electrical machine (4).

* * * * *

UNITED STATES PATENT AND TRADEMARK OFFICE
CERTIFICATE OF CORRECTION

PATENT NO. : 6,705,416 B1
DATED : March 16, 2004
INVENTOR(S) : Hans Glonner et al.

It is certified that error appears in the above-identified patent and that said Letters Patent is hereby corrected as shown below:

<u>Title page,</u>
Item [73], Assignee, change "ZF Friedrichshafen KG," to
-- ZF Friedrichshafen AG, --

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,705,416 B1
DATED : March 16, 2004
INVENTOR(S) : Hans Glonner et al.

It is certified that error appears in the above-identified patent and that said Letters Patent is hereby corrected as shown below:

<u>Title page,</u>
Item [73], Assignee, add the following:
-- Bayerische Motorenwerke AG,
 Munchen, (DE) --.

Signed and Sealed this

Sixth Day of September, 2005

JON W. DUDAS
*Director of the United States Patent and Trademark Office*